(12) United States Patent
Kwon et al.

(10) Patent No.: US 11,128,242 B2
(45) Date of Patent: Sep. 21, 2021

(54) MOTOR DRIVING DEVICE INCLUDING SINGLE INVERTER FOR SINGLE-PHASE MOTOR AND THREE-PHASE MOTOR AND APPLIANCE HAVING THE SAME

(71) Applicant: LG ELECTRONICS INC., Seoul (KR)

(72) Inventors: Sunku Kwon, Seoul (KR); Chaseung Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/830,478

(22) Filed: Mar. 26, 2020

(65) Prior Publication Data

US 2020/0395873 A1    Dec. 17, 2020

(30) Foreign Application Priority Data

Mar. 26, 2019 (KR) .......................... 10-2019-0034684
Mar. 26, 2019 (KR) .......................... 10-2019-0034685

(51) Int. Cl.
*H02P 1/30* (2006.01)
*H02P 5/505* (2016.01)

(52) U.S. Cl.
CPC .......... *H02P 5/505* (2016.02); *H02P 2209/01* (2013.01)

(58) Field of Classification Search
CPC .......... H02P 1/30; H02P 5/505; H02P 2209/01
See application file for complete search history.

(56) References Cited

U.S. PATENT DOCUMENTS

2011/0018474 A1*  1/2011  Harhay .................... H02P 1/30
                                                               318/82
2015/0236625 A1    8/2015  Cho

FOREIGN PATENT DOCUMENTS

DE           10342049 A1     5/2005
KR    10-2017-0087271        7/2017

OTHER PUBLICATIONS

Extended European Search Report in European Application No. 20166014.9 dated Jul. 31, 2020, 7 pages.

* cited by examiner

*Primary Examiner* — Cortez M Cook
(74) *Attorney, Agent, or Firm* — Finnegan, Henerson, Farabow, Garrett & Dunner LLP

(57) ABSTRACT

A motor driving device controls a three-phase motor and a single-phase motor to operate in parallel. The motor driving device includes a dc terminal in which an upper and a lower DC-link capacitor are located. The motor driving device also includes a neutral terminal disposed between the upper and lower DC-link capacitors. The motor driving device includes an inverter that includes three pairs of upper switching elements and lower switching elements. Two pairs of upper switching elements and lower switching elements among three pairs are connected to a-phase terminal and b-phase terminal of the three-phase motor, respectively. The other pair of upper switching elements and lower switching elements among three pairs is connected to a first terminal of the single-phase motor. The neutral terminal is connected to c-phase terminal of the three-phase motor and a second terminal of the single-phase motor.

18 Claims, 13 Drawing Sheets

[Simplified Circuit]   [Mode A]   [Mode B]

[POSITION WHERE THE STARTING
TORQUE BECOMES '0' (TWO POINTS)]

(a) CCW DIRECTION        (b) CW DIRECTION

[IDEAL INITIAL ALIGNMENT POSITION]

[INVERTER OUTPUT VOLTAGE]

($S_A,S_B$)=(0,0) USE ONLY V2 VOLTAGE $$V_{as} = V_{bs} = -\frac{V_{dc}}{6}$$

$$V_{cs} = \frac{V_{dc}}{3}$$

($S_A,S_B$)=(1,0) USE V1 + V2 VOLTAGES SIMULTANEOUSLY $$V_{as} = \frac{1}{2}V_{dc}$$

$$V_{bs} = -\frac{1}{2}V_{dc}$$

MOTOR DRIVING DEVICE INCLUDING SINGLE INVERTER FOR SINGLE-PHASE MOTOR AND THREE-PHASE MOTOR AND APPLIANCE HAVING THE SAME

BACKGROUND

1. Field

The present disclosure relates to a driving device for driving a plurality of motors, in particular, for driving a three-phase motor and a single-phase motor using a single inverter, and a home appliance having the same.

2. Description of the Related Art

A motor refers to an apparatus in which a rotor rotates with respect to a stator, and a motor driver may refer to a device for controlling the driving of the motor.

A coil is wound around the stator and the direction of the magnetic field is alternately altered by applying an alternating current, so that the rotor rotates with respect to the stator according to the change of the magnetic field.

The motor driver is a device for controlling the driving of the motor, and may be configured to control the rotation speed, the rotation direction, and the torque of the rotor.

When the motor and the motor driver are applied to a home appliance, a processor or a controller of the home appliance controls the motor drive to control the driving of the motor.

The motor driver may broadly include an inverter, an inverter controller, an output current detector for detecting an output current flowing through the motor, and an output voltage detector for detecting an output voltage applied to the motor. The motor driver may narrowly mean an inverter or an inverter circuit.

In general, in order to drive a three-phase motor, a three-phase motor driver or inverter circuit using six switching elements is applied.

For the purpose of reducing the material cost, an inverter topology using a connection point of four switching elements and a neutral terminal between the upper and lower DC-link capacitors is proposed.

That is, it may be a method of omitting a pair of switching elements for switching a current of a specific phase, and connecting a node between capacitors of both upper and lower ends with a specific phase of a three-phase motor.

However, in this case, a difference between a command voltage and an actual generated voltage occurs due to a difference in the DC link voltage applied from both ends of the upper and lower capacitors.

Due to such an asymmetrical output voltage characteristic, torque ripple in the motor becomes large and a reduction in voltage utilization inevitably occurs.

Therefore, in the inverter including four switching elements, it is a major problem to improve the distortion phenomenon of the output voltage and the increasing unbalance characteristic in comparison with the inverter including six switching elements.

Korean Patent Publication No. 10-2017-0087271 (hereinafter referred to as "prior patent") proposes a motor driving apparatus for controlling a three-phase motor and a single-phase motor using a single inverter, and a home appliance including the same.

However, the prior patent does not specifically disclose a matter for a parallel operation method of a three-phase motor and a single-phase motor. That is, in the case of controlling a three-phase motor and a single-phase motor by using a single inverter, it does not clearly suggest a motor control method for all the cases that can occur. In other words, in the case where only the single-phase or the three-phase motor is driven, in the case where two motors are driven simultaneously, and in the case where one motor is driven while starting another motor, it does not clearly disclose a motor control method for each case.

The voltage vector application period (180 degrees) of the single-phase motor is different from the voltage vector application period (90 degrees) of the three-phase motor. The prior patent does not disclose a specific compensation method of voltage deviation, in a parallel operation method of motors having different voltage vector application periods.

Meanwhile, in the single-phase motor, due to its characteristics, a position where a starting torque becomes zero exists according to the starting torque position. That is, there is a problem in that starting is impossible when the rotor exists in a specific position in the single-phase motor.

Obviously, it may be possible to solve the starting problem by changing the structure of the single-phase motor. However, such a structure change is possible only in a one-way starting, which leads to a difficulty in a motor manufacturing and an optimization. In addition, a structure for connecting a starting capacitor between a main winding and an auxiliary winding may be used.

In this structure, as a line-start method, a fixed frequency method of applying a fixed frequency power and a method of applying a variable frequency using an inverter may be applied.

However, the fixed frequency method has a problem that only one-way starting is possible, and the variable frequency method has a problem that starting is impossible or not smooth due to lack of starting torque at a specific position.

Therefore, when drive-controlling the single-phase motor and the three-phase motor by using a single inverter, there is a need to find ways to minimize the output voltage unbalance, to smoothly start in both directions by aligning the single-phase motor, and to maximize the starting characteristic by aligning the three-phase motor.

SUMMARY

The present disclosure has been made in view of the above problems, and provides a motor driver that can effectively perform a parallel operation of a single-phase motor and a three-phase motor through a single inverter, and a control method thereof.

The present disclosure further provides a motor alignment method that can eliminate the non-available starting of a single-phase motor and maximize the starting torque.

The present disclosure further provides a motor alignment method that can maximize the starting torque in a three-phase motor.

The present disclosure further provides a motor driver that can stably drive a single-phase motor and a three-phase motor by solving the voltage unbalance, and a control method thereof.

In order to achieve the above object, according to an embodiment of the present disclosure, it is possible to provide a motor driving device for driving a single-phase motor and a three-phase motor in parallel, and a control method thereof. It is possible to provide a home appliance to which the single-phase motor, the 3-phase motor, and the motor driving device are applied, and a control method thereof.

A typical example of such a home appliance is a washing machine, and a motor driving device according to the present embodiment may be applied to a home appliance such as a refrigerator and an air conditioner which uses a plurality of motors.

In detail, the motor driving device may be configured to a three-phase motor and a single-phase motor to operate in parallel through an inverter including three pairs of upper switching elements and lower switching elements and connected to a dc terminal in which upper and lower DC-link capacitors are located, wherein there is a neutral terminal between the upper and lower DC-link capacitors.

In the motor driving device, two pairs of upper switching elements and lower switching elements among three pairs are connected to a-phase terminal and b-phase terminal of the three-phase motor, respectively, the other pair of upper switching elements and lower switching elements among three pairs is connected to a first terminal of the single-phase motor, and the neutral terminal is connected to c-phase terminal of the three-phase motor and a second terminal of the single-phase motor.

It is preferable that the first upper switching element and the first lower switching element of the other pair among the three pairs are controlled to operate complementarily to prevent an arm short so that simultaneous tuning-on is impossible.

Preferably, the operation of the first upper switching element and the first lower switching element is performed in consideration of the dead time and idle time which are unique characteristics of the element.

Preferably, a maximum time of turning on and off when a first upper switching element and a first lower switching element are operated is set to be smaller than a sum of a dead time and an idle time of the first upper switching element and the first lower switching element.

When a driving command of the single-phase motor is received to the motor driving device, the motor driving device controls the single-phase motor to align a rotor of the single-phase motor, and to avoid a non-available starting position after aligning the rotor.

Preferably, the motor driving device controls the rotor to apply a pulsating current into the single-phase motor during driving of the first upper switching element and the first lower switching element for avoiding a non-available starting position.

It is preferable that the motor driving device sets and controls to differentiate a ratio of the turning-on time of the first upper switching element from a ratio of the turning-off time of the first lower switching element.

It is preferable that the motor driving device controls the rotor to differentiate a value of current and torque applied to the single-phase motor by turning-on of the upper switching element from a value of current and torque applied to the single-phase motor by turning-on of the lower switching element for avoiding the non-available starting position.

The current and torque applied to the single-phase motor may be performed based on a PWM signal.

The waveform of the PWM signal may be any one of a sine waveform, a square waveform, and a trapezoidal waveform.

It is preferable that when the driving command of the single-phase motor is received to the motor driving device, the motor driving device changes a driving method of the single-phase motor based on whether the three-phase motor is currently driven. Through this, alignment of the single-phase motor can be performed more effectively, and it is possible to reduce voltage unbalance.

It is preferable that when the three-phase motor is driven, the motor driving device controls to apply a pulsating current for generating a forward or reverse rotational torque to the single-phase motor, during the driving of the first upper switching element and the first lower switching element.

It is preferable that the motor driving device controls to apply a pulsating current to the single-phase motor in a section in which only a upper DC link voltage corresponding to a voltage of the upper DC-link capacitor is applied to the three-phase motor through the two pairs among the three pairs and in a section where only a lower DC link voltage corresponding to a voltage of the lower DC-link capacitor is applied, It is preferable that the motor driving device drives the first upper switching element to be turned on to output a positive current in a section where only the lower DC link voltage is applied to the three-phase motor, drives the first lower switching element to be turned on to output a negative current in a section where only the upper DC link voltage is applied to the three-phase motor, so that a voltage unbalance applied to the three-phase motor is reduced.

It is preferable that when the driving command of the three-phase motor is received to the motor driving device, the motor driving device changes a driving method of the three-phase motor based on whether the single-phase motor is currently driven. Through this, alignment of the three-phase motor can be performed more effectively, and voltage unbalance can be reduced.

It is preferable that when the single-phase motor is stopped, the motor driving device aligns the three-phase motor in a section in which both the upper DC link voltage and the lower DC link voltage are applied to the three-phase motor through the two pairs among the three pairs, and in a section in which both the upper DC link voltage and the lower DC link voltage are applied to the three-phase motor.

It is preferable that when the single-phase motor is driven, the motor driving device aligns the three-phase motor by applying only the lower DC link voltage to the three-phase motor in a section where only the upper DC link voltage is applied to the single-phase motor, and aligns the three-phase motor by applying only the upper DC link voltage to the three-phase motor in a section where only the lower DC link voltage is applied to the single-phase motor.

When the driving command of the single-phase motor and the driving command of the three-phase motor are received to the motor driving device at the same time, the motor driving device controls to drive firstly one of the single-phase motor and the three-phase motor and then drive the other. Through this, voltage unbalance can be eliminated and simpler control logic can be configured.

The motor driving device can control the other motor to be driven after a certain time after one of the motors is driven, in a state where both the single-phase motor and the three-phase motor are stopped.

It is preferable that, in order to reduce an output voltage unbalance in the three-phase motor, in a state where both the single-phase motor and the three-phase motor are driven, in a case where speeds of the single-phase motor and the three-phase motor are the same, the motor driving device controls to differentiate a maximum voltage output position of the single-phase motor from a maximum voltage output position of the three-phase motor.

It is preferable that, in order to reduce an output voltage unbalance in the three-phase motor, in a state where both the single-phase motor and the three-phase motor are driven, in a case where speeds of the single-phase motor and the three-phase motor are different, the motor driving device controls to differentiate a ratio of a section in which only a upper DC link voltage corresponding to a voltage of the upper DC-link capacitor is applied to the single-phase motor from a ratio of a section in which only a lower DC link voltage corresponding to a voltage of the lower DC-link capacitor is applied to the single-phase.

It is preferable that, when the lower DC link voltage is larger than the upper DC link voltage, the motor driving device controls driving of the other pair among the three pairs so that the section in which only the upper DC link voltage is applied decreases and the section in which only the lower DC link voltage is applied increases within one cycle, and when the lower DC link voltage is smaller than the upper DC link voltage, controls the driving of the other pair among the three pairs so that the section in which only the upper DC link voltage is applied increases and the section in which only the lower DC link voltage is applied decreases within one cycle.

It is preferable that the motor driving device performs the decrease and increase of the section proportionally as a cycle progresses.

It is preferable that the motor driving device controls the duty ratio of the two pairs among the three pairs to be uniformly maintained even when the upper DC link voltage and the lower DC link voltage are different.

In order to achieve the above object, according to an embodiment of the present disclosure, it is possible to provide a motor driving device for driving a single-phase motor and a three-phase motor in parallel, and a control method thereof. It is possible to provide a home appliance to which the single-phase motor, the three-phase motor, and the motor driving device are applied, and a control method thereof.

A typical example of such a home appliance is a washing machine, and a motor driving device according to the present embodiment may be applied to a home appliance such as a refrigerator and an air conditioner which uses a plurality of motors.

In detail, the motor driving device may be configured to control a three-phase motor and a single-phase motor to operate in parallel through an inverter including three pairs of upper switching elements and lower switching elements and connected to a dc terminal in which upper and lower DC-link capacitors are located, wherein there is a neutral terminal between the upper and lower DC-link capacitors.

In the motor driving device, two pairs of upper switching elements and lower switching elements among three pairs are connected to a-phase terminal and b-phase terminal of the three-phase motor, respectively, the other pair of upper switching elements and lower switching elements among three pairs is connected to a first terminal of the single-phase motor, and the neutral terminal is connected to c-phase terminal of the three-phase motor and a second terminal of the single-phase motor.

In the motor driving device, another pair of switching units (single phase switching unit) is connected to a first terminal of the single-phase motor, and a second terminal of the single-phase motor is connected to the neutral terminal, so that the other pair among the three pairs can be configured to control the driving of the single-phase motor.

The motor driving device may be configured to control the single-phase motor and the three-phase motor to be interlocked and operate in parallel through the other pair among the three pairs and the two pairs among the three pairs, when the single-phase motor and the three-phase motor are simultaneously driven.

The motor driving device may be configured to control the other motor to be driven after a predetermined time after one of the motors is driven in a state where both the single-phase motor and the three-phase motor are stopped.

When the driving command of the single-phase motor and the driving command of the three-phase motor arrive at the motor driving device at the same time, the motor driving device controls to drive firstly one of the single-phase motor and the three-phase motor and then drive the other.

In order to reduce an output voltage unbalance in the three-phase motor, in a state where both the single-phase motor and the three-phase motor are driven, the motor driving device controls the parallel operation of the single-phase motor and the three-phase motor in the case where the speeds of the single-phase motor and the three-phase motor are the same to be different from in the case where the speeds of the single-phase motor and the three-phase motor are different.

It is preferable that the motor driving device outputs a voltage of the single-phase motor in association with or synchronized with an electrical angle reference position information of the three-phase motor.

It is preferable that the motor driving device maintains a driving condition of the two pairs among the three pairs and varies a driving condition of the other pair among the three pairs.

It is preferable that the motor driving device controls to output a voltage of the single-phase motor in association with or synchronized with an electrical angle reference position information of the three-phase motor.

The motor driving apparatus may control the maximum voltage output position of the single-phase motor and the maximum voltage output position of the three-phase motor differently, when the speeds of the single-phase motor and the three-phase motor are the same.

In a case where speeds of the single-phase motor and the three-phase motor are different, the motor driving device controls to differentiate a ratio of a section in which only a upper DC link voltage corresponding to a voltage of the upper DC-link capacitor is applied to the single-phase motor from a ratio of a section in which only a lower DC link voltage corresponding to a voltage of the lower DC-link capacitor is applied to the single-phase.

It is preferable that when the lower DC link voltage is larger than the upper DC link voltage, the motor driving device controls driving of the other pair among the three pairs so that the section in which only the upper DC link voltage is applied decreases and the section in which only the lower DC link voltage is applied increases within one cycle, and when V2 is smaller than V1, controls the driving of the other pair among the three pairs so that the section in which only the upper DC link voltage is applied increases and the section in which only the lower DC link voltage is applied decreases within one cycle.

It is preferable that the motor driving device performs the decrease and increase of the section proportionally as the cycle progresses.

It is preferable that the motor driving device controls the duty ratio of the two pairs among the three pairs to be uniformly maintained even when the upper DC link voltage and the lower DC link voltage are different.

It is preferable that when a driving command of the single-phase motor is received to the motor driving device, the motor driving device controls the single-phase motor to align a rotor of the single-phase motor, and to avoid a non-available starting position after aligning the rotor.

It is preferable that the motor driving device controls the rotor to apply a pulsating current into the single-phase motor during driving of the first upper switching element and the first lower switching element.

It is preferable that the motor driving device sets and controls to differentiate a ratio of the turning-on time of the first upper switching element from a ratio of the turning-off time of the first lower switching element.

The motor driving device controls the rotor to differentiate a value of current and torque applied to the single-phase motor by turning-on of the upper switching element of the other pair among the three pairs from a value of current and torque applied to the single-phase motor by turning-on of the lower switching element of the other pair among the three pairs for avoiding the non-available starting position.

The current and torque applied to the single-phase motor may be performed based on a PWM signal.

It is preferable that when the driving command of the single-phase motor is received to the motor driving device, the motor driving device changes a driving method of the single-phase motor based on whether the three-phase motor is currently driven.

When the three-phase motor is driven, the motor driving device controls to apply a pulsating current for generating a forward or reverse rotational torque to the single-phase motor, during the driving of the first upper switching element and the first lower switching element.

It is preferable that when the driving command of the three-phase motor is received to the motor driving device, the motor driving device changes a driving method of the three-phase motor based on whether the single-phase motor is currently driven.

It is preferable that when the single-phase motor is stopped, the motor driving device aligns the three-phase motor in a section in which both the upper DC link voltage and the lower DC link voltage are applied to the three-phase motor through the two pairs among the three pairs, and in a section in which both the upper DC link voltage and the lower DC link voltage are applied to the three-phase motor, and It is preferable that when the single-phase motor is driven, the motor driving device aligns the three-phase motor by applying only the lower DC link voltage to the three-phase motor in a section where only the upper DC link voltage is applied to the single-phase motor, and aligns the three-phase motor by applying only the upper DC link voltage to the three-phase motor in a section where only the lower DC link voltage is applied to the single-phase motor.

When the single-phase motor and the three-phase motor are simultaneously driven, the motor driving device controls the single-phase motor and the three-phase motor to be interlocked and operate in parallel through the other pair among the three pairs and the two pairs among the three pairs.

It is preferable that in order to reduce an output voltage unbalance in the three-phase motor, in a state where both the single-phase motor and the three-phase motor are driven, the motor driving device controls a parallel operation of the single-phase motor and the three-phase motor in a case where speeds of the single-phase motor and the three-phase motor are the same to be different from in a case where speeds of the single-phase motor and the three-phase motor are different.

It is preferable that the motor driving device outputs a voltage of the single-phase motor in association with or synchronized with an electrical angle reference position information of the three-phase motor.

The motor driving device maintains a driving condition of the two pairs among the three pairs and varies a driving condition of the other pair among the three pairs.

The motor driving device controls to output a voltage of the single-phase motor in association with or synchronized with an electrical angle reference position information of the three-phase motor.

Features in the above-described embodiments may be applied complexly in other embodiments unless contradictory or exclusive to each other.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
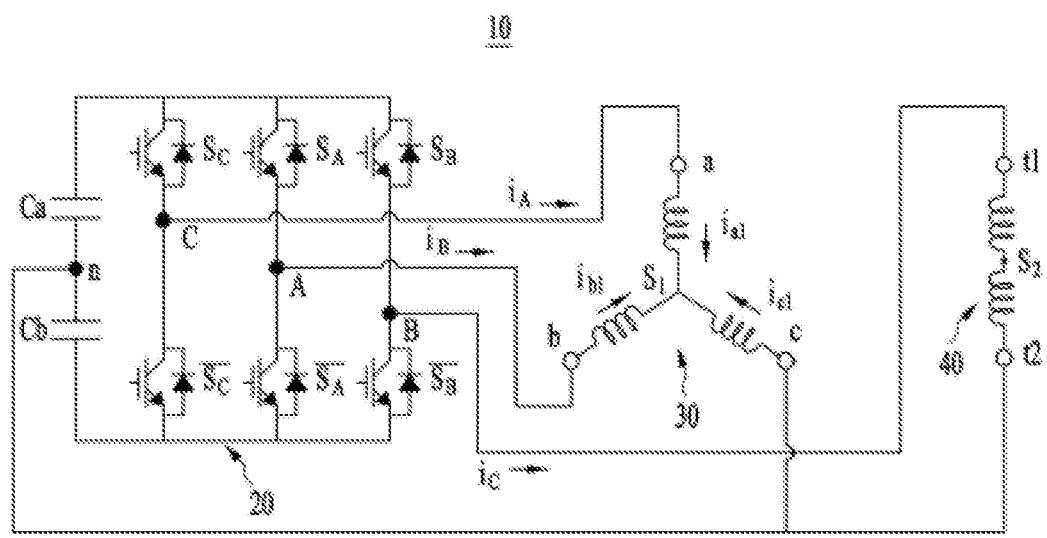
FIG. 1 is a circuit diagram of a motor driver according to an embodiment of the present disclosure.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. The present disclosure is defined only by the scope of the claims. Like reference numerals refer to like elements throughout the specification.

Hereinafter, a motor driver according to an embodiment of the present disclosure will be described in detail with reference to the accompanying drawings.

First, the wiring relationship of a motor driver 10 including a single inverter for controlling the driving of a three-phase motor and a single-phase motor will be described in detail with reference to FIG. 1.

As shown, the inverter may be a inverter 20 including six switching elements.

However, in the present embodiment, two switching elements Sc and Sc_bar are used to control the driving of a single-phase motor 40, and four switching elements Sa, Sa_bar, Sb and Sb_bar can be used to control the driving of a three-phase motor 30.

Therefore, the two switching elements and the four switching elements may be connected to each other to be formed similarly to the inverter, and the present embodiment can be implemented through a single inverter.

In some exemplary embodiments, the motor driver 10 may be provided separately from the three-phase motor 30 and the single-phase motor 40 and then connected with the three-phase motor 30 and the single-phase motor 40. An external AC power may be applied to the motor driver 10, and may include other elements not shown. In particular, an inverter drive unit or an inverter controller for driving an inverter may be included in the motor driver 10 or connected to the motor driver 10.

Two switching elements disposed in upper and lower side may be provided to apply a current of a specific phase in pairs. That is, it can be provided to apply the current of any one of the a, b, and c-phases. An inverter leg C node in the left pair of switching elements may be connected to a a-phase terminal of the three-phase motor 30. An inverter leg A node in the middle pair of switching elements may be connected to a b-phase terminal of the three-phase motor 30. An inverter leg B node in the right pair of switching elements may be connected to c terminal of the single-phase motor 40, and a neutral terminal n node may be connected to c-phase terminal of the three-phase motor 30 and t2 terminal of the single-phase motor 40.

Here, the neutral terminal n means a connection point of an upper and lower DC-link capacitors Ca and Cb, and the inverter 10 has such a neutral terminal n.

A pair of six switching elements Sa, Sa_bar, Sb Sb_bar, Sc and Sc_bar (single-phase switching unit) may be provided for the control of the single-phase motor 40, and the other two pairs of six switching elements Sa, Sa_bar, Sb Sb_bar, Sc and Sc_bar may be provided for the control of the three-phase motor 30.

In the example illustrated in FIG. 1, the two pairs among the three pairs Sa, Sa_bar, Sb Sb_bar, Sc and Sc_bar may be the switching elements Sc, Sc_bar, Sa, Sa_bar, and the other pair among the three pairs may be the switching elements Sb and Sb_bar.

Therefore, the two pairs among the three pairs may be provided to be connected to the a-phase terminal and the b-phase terminal of the three-phase motor 30, respectively, and the other pair among the three pairs may be provided to be connected to a first terminal t1 of the single-phase motor 40. The neutral terminal n may be provided to be connected to the c-phase terminal of the three-phase motor 30 and a second terminal t2 of the single-phase motor 40.

A wiring extended from the neutral terminal n is branched and connected to the c-phase terminal of the three-phase motor 30 and the second terminal t2 of the single-phase motor 40, respectively.

In addition, in order to control the driving of the three-phase motor 30, the two pairs among the three pairs is provided to be connected to the a-phase terminal and the b-phase terminal of the three-phase motor 30, respectively, and the neutral terminal n is connected to the c-phase terminal of the three-phase motor 30, and the driving of the three-phase motor 30 is controlled by the two pairs among the three pairs.

In addition, in order to control the driving of the single-phase motor 40, the other pair among the three pairs is connected to the first terminal t1 of the single-phase motor 40, and the second terminal t2 of the single-phase motor 40 is connected to the neutral terminal n, so that the driving of the single-phase motor 40 is controlled by the other pair among the three pairs.

When the single-phase motor 30 and the three-phase motor 40 are simultaneously driven through such a connection relationship, the single-phase motor 30 and the three-phase motor 40 may be controlled to be interlocked and driven in parallel through the other pair among the three pairs and the two pairs among the three pairs.

Meanwhile, the wiring structure can be variously changed through the inverter 20 having three pairs of switching elements. That is, it can be changed depending on which pair of the three pairs of the switching unit is connected to the single-phase motor 40.

Figure 2:
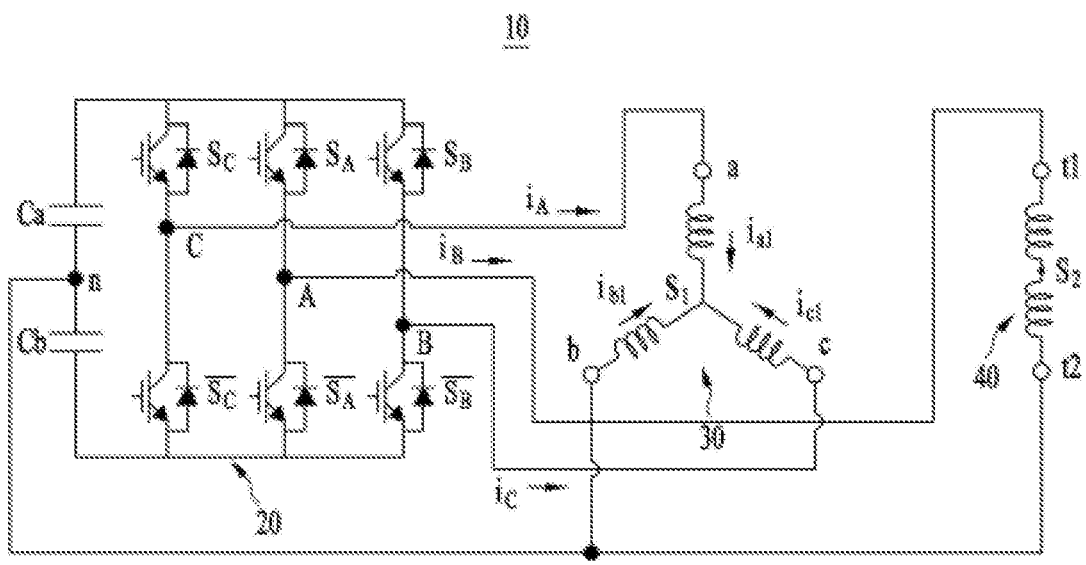
FIG. 2 is a circuit diagram of a motor driver according to another embodiment of the present disclosure.
Figure 3:
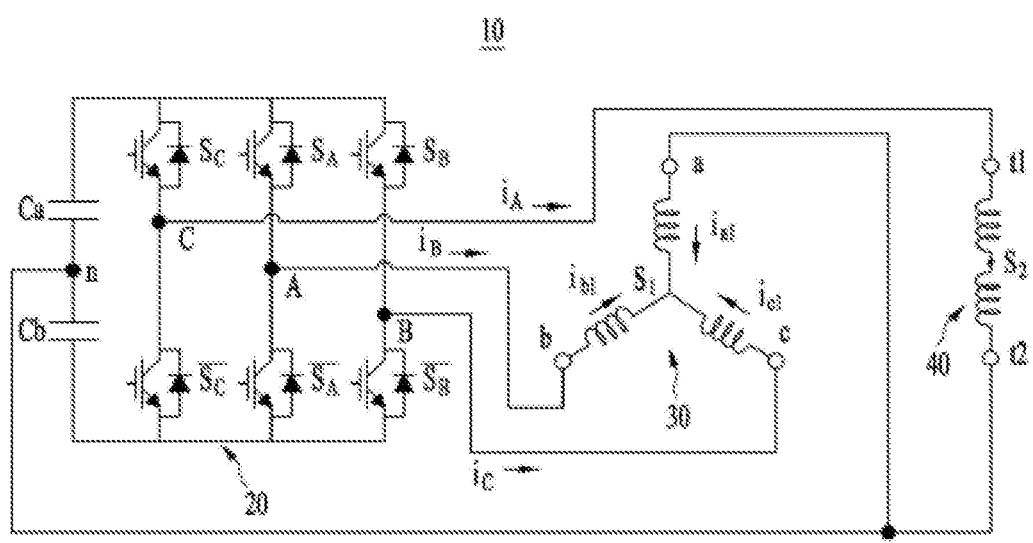
FIG. 3 is a circuit diagram of a motor driver according to another embodiment of the present disclosure.

FIG. 1 illustrates an embodiment in which a pair of right switching elements Sb and Sb_bar is connected to a single-phase motor 40, FIG. 2 illustrates an embodiment in which a pair of middle switching elements Sa and Sa_bar is connected to a single-phase motor 40, and FIG. 3 illustrates an embodiment in which a pair of left switching elements Sc and Sc_bar is connected to a single-phase motor 40.

Therefore, various wiring changes are possible through the inverter. In other words, it means that in the inverter having a, b, and c three-phase, if necessary, any one of the a, b, and c-phase may be used for the single-phase motor 40.

That is, the position of the switching element connected to the single-phase motor 40 may be varied for the convenience of the position or wiring of the three-phase motor 30 and the single-phase motor 40.

Hereinafter, a method of controlling a motor driver according to an embodiment of the present disclosure will be described in detail with reference to FIG. 4.

Figure 4:
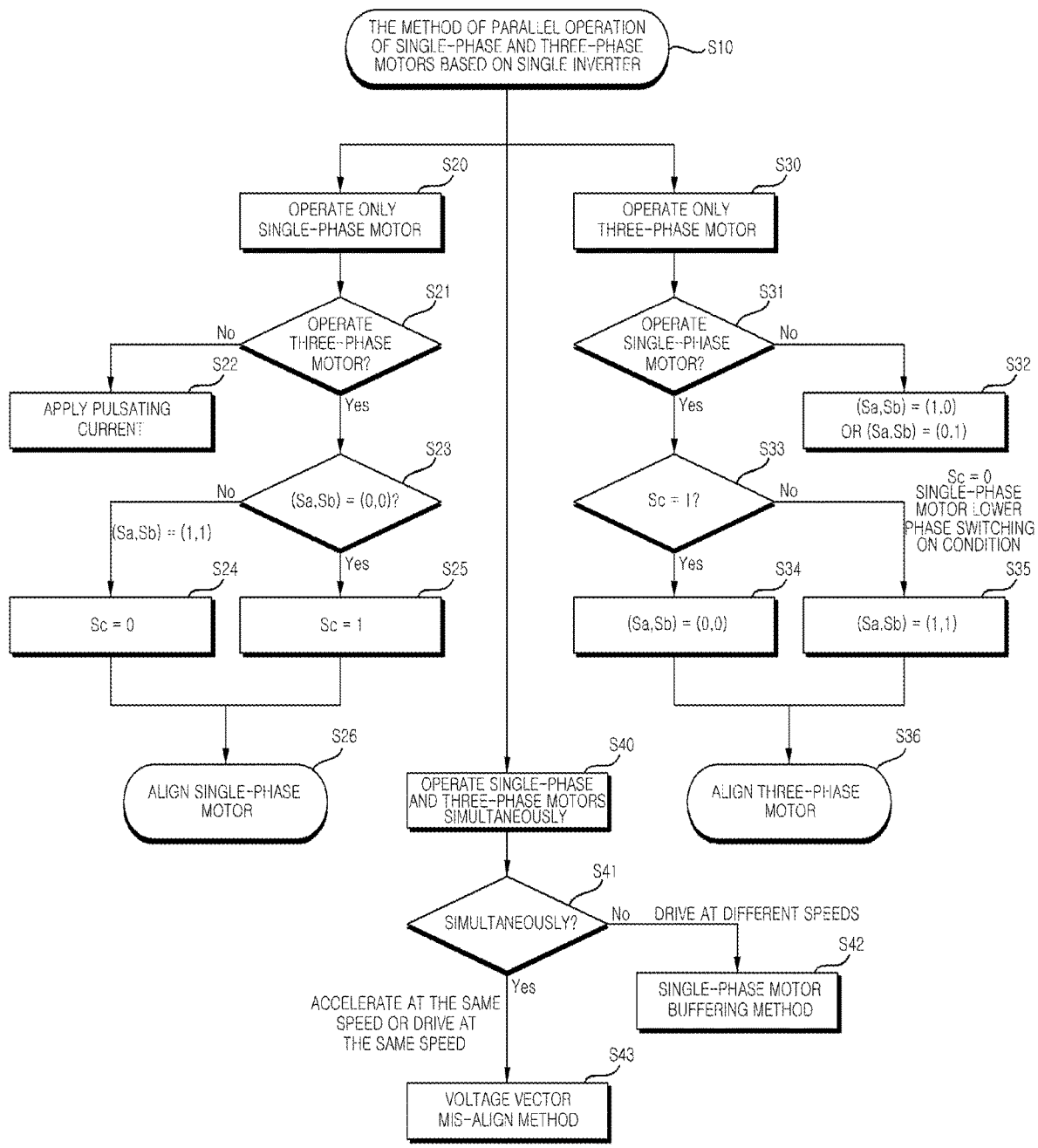
FIG. 4 is a control flowchart of a control method according to an embodiment of the present disclosure.

FIG. 4 shows a control flow according to an embodiment of the present disclosure. For convenience of description, it is assumed that the c-phase among the a, b, and c-phases is used for the single-phase motor 40.

That is, the alignment method of the single-phase motor 40, the alignment method of the three-phase motor 30, and the method of minimizing the output voltage unbalance will be described in detail using the wiring structure (total drive system) shown in FIG. 3.

As shown in FIG. 4, the control method of the motor driver according to an embodiment of the present disclosure may be specifically related to a parallel operation method of single inverter based single-phase and three-phase motors. That is, the single-phase motor 40 and the three-phase motor 30 can be controlled through a single inverter but can be driven or stopped independently of each other.

Obviously, in a strict sense, the single-phase motor 40 and the three-phase motor 30 may not be driven independently. This is because a single-phase switching unit is shared actually for the control of the single-phase motor 40 and the three-phase motor 30.

The case where the motors are respectively driven may be aside from the subject, but when the motor are driven simultaneously, they may inevitably be influenced by each other. It may be preferable to minimize such an effect so that independent driving can be achieved substantially.

The driving command of the single-phase motor 40 and/or the three-phase motor 30 may be transmitted to the motor driver through a processor of home appliance. By receiving such a command from the motor driver, the control method according to the embodiment of the present disclosure can be started (S10).

For convenience of description, the case of starting to drive only single-phase motor 40 with respect to the parallel operation method of single inverter-based single-phase and three-phase motors (S20), the case of starting to drive only three-phase motor 30 (S30), and the case of starting to drive the single-phase motor 40 and the three-phase motor 30 start simultaneously (S40) are explained sequentially.

When a driving command of the single-phase motor 40 is received (S20), a control for driving the single-phase motor 40 may be performed. At this time, a step S21 of determining whether the three-phase motor 30 is driving may be performed. When the three-phase motor 30 is driving, the method for driving the single-phase motor 40 will be varied.

The alignment method of the single-phase motor 40 for driving the single-phase motor 40 is as follows.

First, the case where the three-phase motor 30 is not driven will be described.

Figure 5:
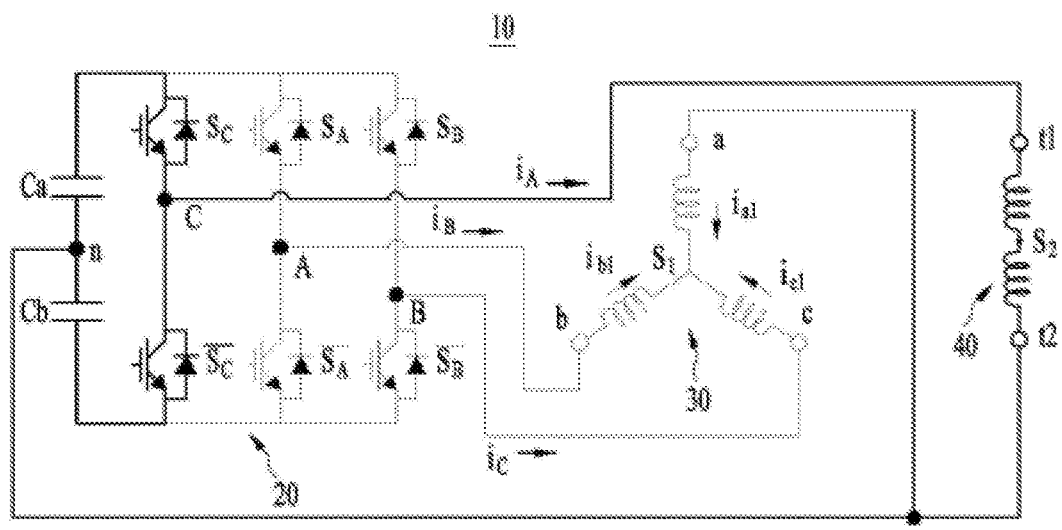
FIG. 5 is a circuit diagram intuitively showing a case where only a single-phase motor is driven in the embodiment shown in FIG. 3.

As shown in FIG. 5, when only single-phase motor 40 is driven, in an entire motor driving system, the inverter part for controlling the three-phase motor 30 and the three-phase motor 30 may be considered as a non-use state. That is, the three-phase motor 30 is in a state of not being driven.

Therefore, the switching element and the wiring in use may be indicated in black (or dark color), and the non-use switching element and the wiring may be indicated in gray (or light color). In this case, the entire motor driving system may be indicated by a simplified circuit as shown in FIG. 6.

The single-phase motor 40 has a characteristic that the starting torque is not generated in a specific position coinciding with the voltage and current vector direction. To avoid this specific position, mode A may be defined when the upper switch Sc is turned on, and mode B may be defined when the lower switch Sc_bar is turned on.

Figure 6:
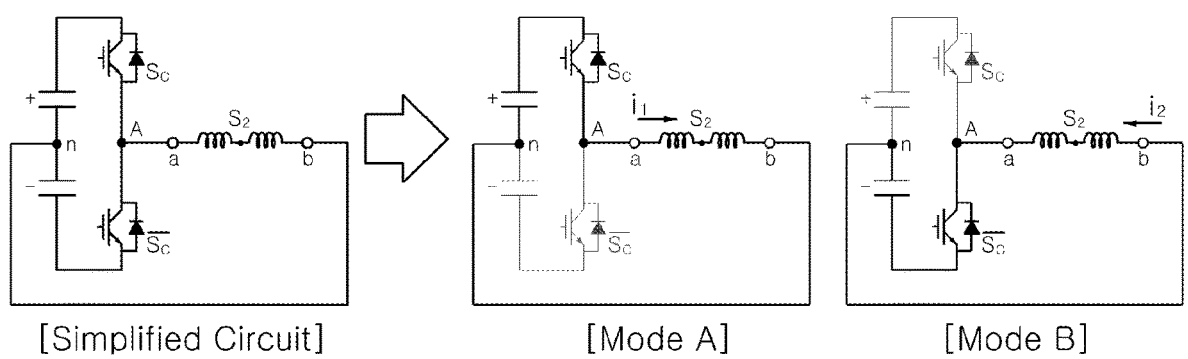
FIG. 6 is a simplified circuit diagram of a motor driver in a case where only a single-phase motor is driven.

In the simplified circuit diagram shown in FIG. 6, in the case of the mode A, the wiring through which current flows may be indicated by darker lines, and the wiring through which current does not flow may be indicated in gray (or lighter color).

In addition, in the case of the mode B, the wiring through which current flows may be indicated by darker lines, and the wiring through which current does not flow may be indicated in gray (or lighter color). Therefore, as the upper switch Sc and the lower switch Sc_bar are alternately turned on/off, the alternating current is applied to the single-phase motor 40 (S22).

That is, as shown in FIG. 4, the alignment of the single-phase motor 40, i.e. the position of the rotor of the single-phase motor 40 is aligned by applying the pulsating current. Obviously, normal driving is performed after the alignment of the rotor.

Here, it may be preferable that the upper switch Sc and the lower switch Sc_bar cannot be simultaneously turned on to prevent an arm short, and a complementary operation is performed by reflecting dead time and idle time considering the circuit and device characteristics.

That is, the operation of the first upper switching element Sc and the first lower switching element Sc_bar may be performed in consideration of dead time and idle time which are inherent characteristics of the device and the circuit.

Specifically, when first the upper switching element Sc and the first lower switching element Sc_bar are operated, it may be preferable that the maximum time in turned on and off is set to be smaller than the sum of the dead time and the idle time.

Figure 7:
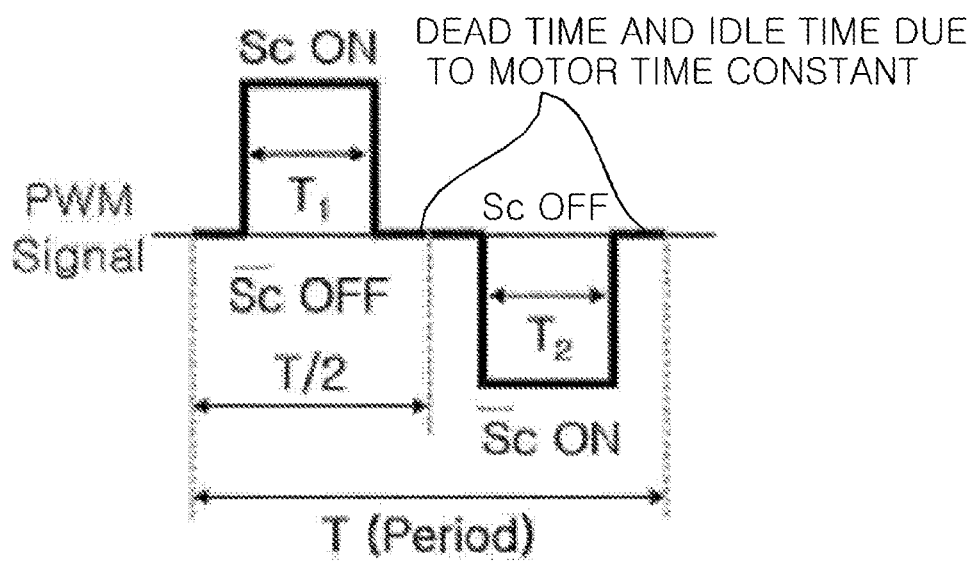
FIG. 7 is a schematic diagram for explaining the on/off period of a single-phase switching unit.

The alignment method of the single-phase motor 40 may be summarized and expressed by a timing sequence shown in FIG. 7.

When the total period T is arbitrarily set according to motor characteristic (e.g., by a parameter such as the dead time and the idle time) by changing the ratio of the time T1 when Sc is turned on and the time T2 when Sc_bar is turned on, it is possible to avoid a point where no starting torque is generated by continuously turning on Sc or Sc_bar.

That is, the rotor can escape from a non-startable area by applying alternating current or pulsating current. At this time, the ratio of the applied T1 and T2 times may be symmetrical or asymmetrical according to the motor parameter.

However, it may be preferable to fix this ratio and apply current and perform the position alignment operation of the rotor.

Figure 8:
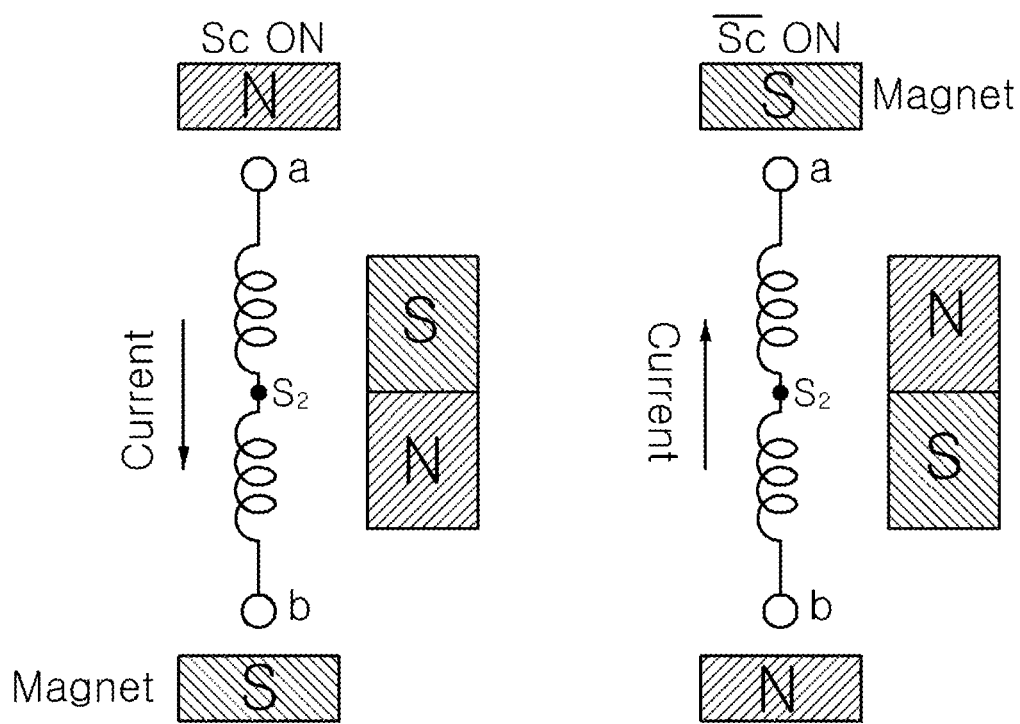
FIG. 8 is a schematic diagram schematically showing a position where the starting torque of a rotor of a single-phase motor is zero.

FIG. 8 shows two positions where the starting torque is zero. That is, when the magnetic field direction in the stator and the magnetic field direction in the rotor are identical, the force can be balanced and the starting torque can be zero.

A voltage applied as a short PWM signal (switching signal) as shown in FIG. 7 within a switching frequency section operating at several kHz cannot generate the current and torque that cause the movement of motor.

Figure 9:
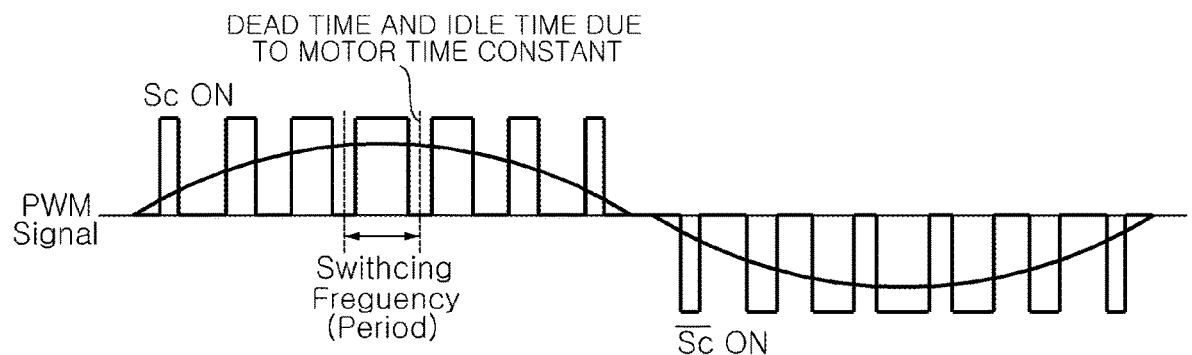
FIG. 9 is a schematic diagram for explaining the on/off period of a single-phase switching unit in a single-phase PWM control.

Therefore, as shown in FIG. 9, the single-phase motor 40 may be aligned with the current and torque applied through the switching signal based on the PWM control. Through the application of asymmetrical current and torque, the initial position of the rotor can be changed in an arbitrary direction.

That is, as shown, the initial position of the rotor may be changed by a difference between the integral value of the positive current amount and the integral value of the negative current amount.

For example, when the positive current amount is greater than the negative current amount, the N pole of the rotor is moved to a position facing the a-phase of the stator.

Here, the waveform of the switching signal, i.e., the current and torque waveforms, is illustrated as a sinusoidal waveform. However, it can be transformed into a square or trapezoidal waveform.

In summary, when the three-phase motor 30 is stopped, a pulsating current may be applied to align the rotor of the single-phase motor 40, and then the single-phase motor 40 may be started (S22).

That is, the rotor may be aligned to the initial alignment position by applying the alternating current, and the initial alignment position may be a position which avoided the above-mentioned non-startable position.

Figure 10:
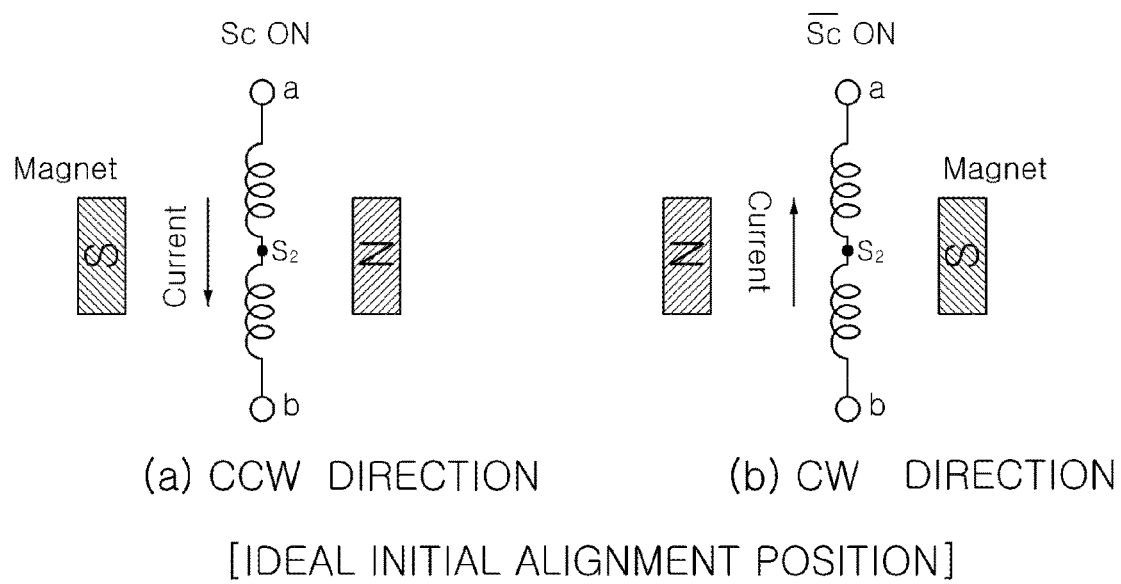
FIG. 10 is a schematic diagram schematically showing an abnormal alignment position with respect to a rotor of a single-phase motor.

Specifically, as shown in FIG. 10, the rotor may be placed in an ideal initial alignment position, and then a current for generating the forward or reverse rotation torque is applied to start the rotor. The ideal initial alignment position differs depending on the direction of rotation.

That is, diagram (a) of FIG. 10 shows an ideal initial alignment position for the rotor to rotate counterclockwise, while diagram (b) FIG. 10 shows an ideal initial alignment position for the rotor to rotate clockwise.

Obviously, in consideration of the direction of rotation of the rotor, it can be aligned to any one of two ideal positions. However, this initial position can be arbitrarily set to any one of the two, and can be set to any one by default.

For example, a mechanical component through a unidirectional rotation allowable bearing or a separate algorithm circuit for detecting the direction of rotation may be additionally provided.

When abnormal rotation is detected through the component or algorithm (e.g., if it needs to be rotated clockwise but rotates counterclockwise), alignment and restarting after stopping can be performed again so that normal rotation direction of the rotor can be achieved When the three-phase motor 30 is stopped, the alignment and starting of the single-phase motor 40 and normal operation control are possible only by driving the other pair among the three pairs.

Next, the alignment method of the single-phase motor 40 during the driving of the three-phase motor 30 will be described.

During the driving of the three-phase motor 30, it is preferable to perform the other alignment method in the single-phase motor 40 as described above.

Even in this case, a pulsating current must be applied for the alignment of the single-phase motor 40, in particular, for the position alignment of the rotor. However, in this case, the pulsating current must be applied by synthesis.

If the three-phase motor 30 is driven when the driving command (S20) of the single-phase motor 40 is performed, a step for synthesizing the pulsating current is performed.

That is, the driving of the first upper switching element Sc and the first lower switching element Sc_bar may be controlled to apply a pulsating current for generating a forward or reverse rotational torque to the single-phase motor 40.

First, in a section where the three-phase motor 30 uses only a lower DC link voltage corresponding to a voltage of the lower DC-link capacitor, i.e. in the section (Sa, Sb)=(0, 0), a positive current for aligning the single-phase motor 40 using the upper DC-Link voltage V1 is output through a switching (Sc=1) which is a sequence of turning on the upper switch. On the other hand, in a section where the three-phase motor 30 uses only an upper DC link voltage corresponding to a voltage of the upper DC-link capacitor, i.e., in the section (Sa, Sb)=(1, 1), a negative current for aligning the single-phase motor 40 using the lower DC-Link voltage V2 is output through a switching (Sc=0) which is a sequence of turning on the lower switch, thereby solving the voltage unbalance.

In other words, it may be preferable that the motor drive controls such that the pulsating current is applied into the one-phase motor, in the section where only a upper DC link voltage corresponding to a voltage of the upper DC-link capacitor is applied to the three-phase motor 30 through the two pairs among the three pairs (Sa, Sa_bar, Sb, Sb_bar), and in the section where only a lower DC link voltage corresponding to a voltage of the lower DC-link capacitor is applied.

More specifically, in the section where only the lower DC link voltage is applied to the three-phase motor 30, the upper switching element Sc may be turned on to output a positive current, and in the section where only the upper DC link voltage is applied to the three-phase motor 30, the lower switching element Sc_bar may be turned on to output a negative current.

Therefore, by using only such a specific section, it is possible to reduce the voltage unbalance applied to the three-phase motor 30.

In other words, the single-phase motor 40 may not be aligned in the section where both the upper DC link voltage and the lower DC link voltage are output through the two pairs among the three pairs, but the single-phase motor 40 may be aligned in the section where only the upper DC link voltage or only the lower DC link voltage is output, thereby effectively reducing the voltage unbalance.

Hereinafter, the case where only the three-phase motor 30 starts to drive (S30) will be described.

Alignment in the three-phase motor 30 is a general sequence of initializing the electrical angle of motor control.

In inverter, for example, when a positive current is applied to a-phase, the N pole is typically aligned to a winding corresponding position of a-phase.

However, in case of the inverter including four switching elements, the rotor of the motor may be aligned in the deflected position, not in a corresponding position of each winding current. That is, it can be said that a difference in the alignment position of the initial rotor occurs.

In consideration of this difference, the present embodiment proposes a method for effectively aligning three-phase motors 30, when the single-phase and three-phase motors 30 are operated in parallel through a single inverter.

Figure 11:
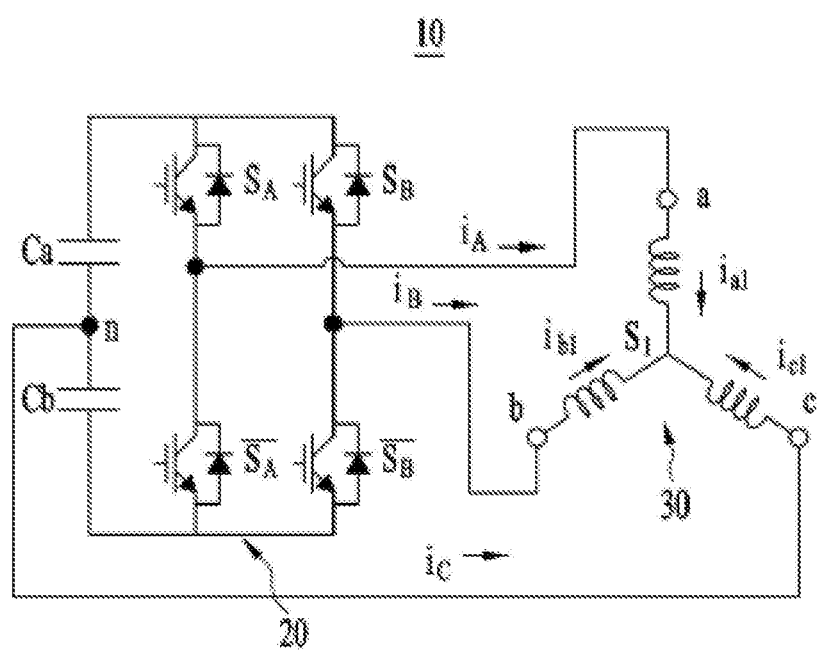
FIG. 11 is a simplified circuit diagram of a motor driver in a case where only a three-phase motor is driven.

As shown in FIG. 11, the entire system (see FIGS. 3 and 5) can be simplified. That is, the single-phase motor and the other pair among the three pairs for controlling the same may be omitted.

Figure 12:
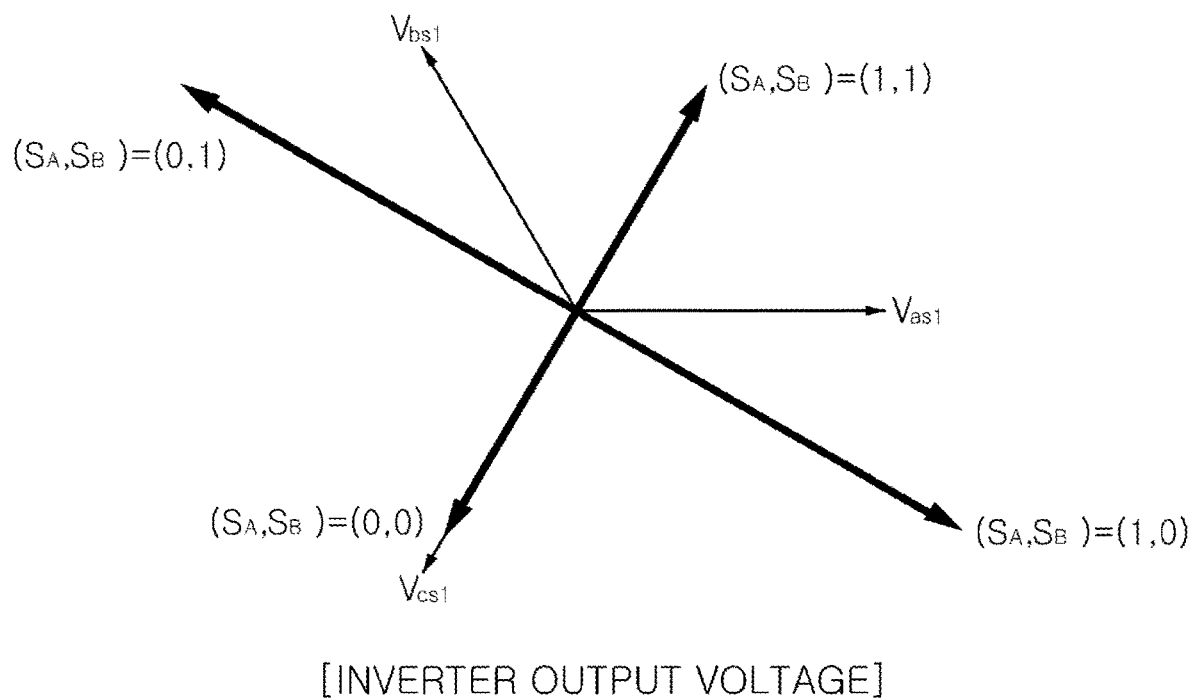
FIG. 12 is an output voltage vector according to a combination of switching unit when only a three-phase motor is driven.

In this case, there are four combinations of the output voltage of the inverter including four switching elements for the three-phase motor 30, as shown in FIG. 12.

In the conventional inverter including six switching elements, a, b, and c-phases, i.e. three positioning can be generated, but in the present embodiment, four positioning can be generated by an operation combination of the two pairs among the three pairs.

In particular, the rotor may not be positioned in a position facing a specific phase, and the rotor may be aligned in a position facing the output voltage and current vector.

Figure 13:
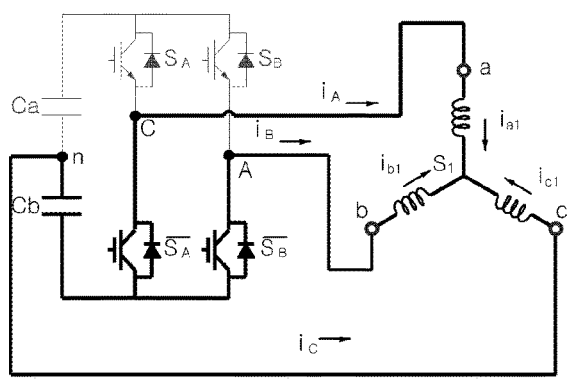
FIG. 13 is a simplified circuit diagram and an output voltage vector in a combination of two of four switching units shown in FIG. 12.
Figure 13:
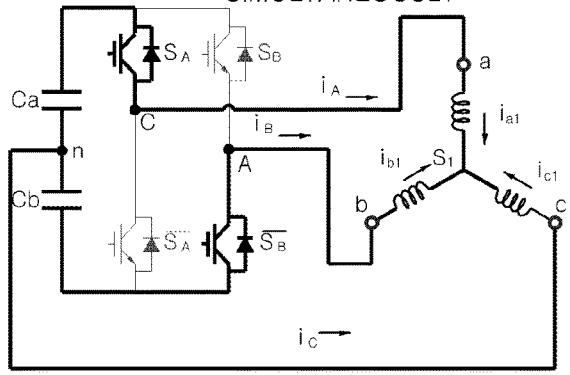
Figure 14:
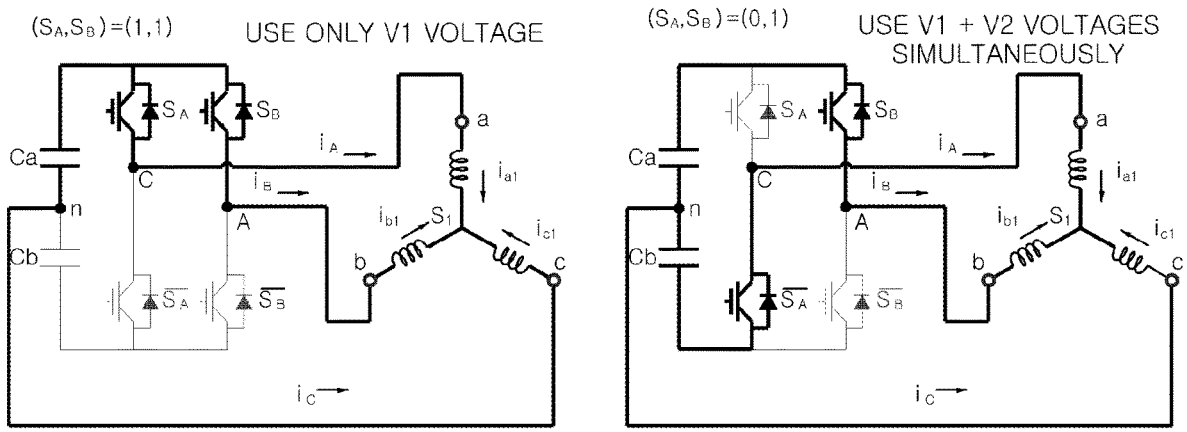
FIG. 14 is a simplified circuit diagram and an output voltage vector in a combination of the other two of four switching units shown in FIG. 12.
Figure 14:
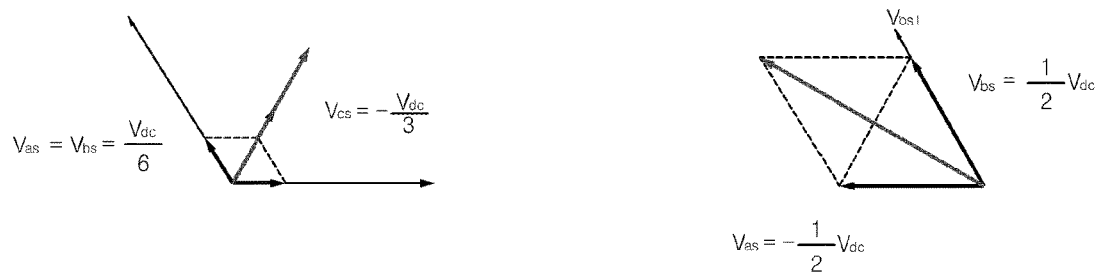

FIGS. 13 and 14 show the switching combination, current flow, current direction and voltage vector in these four combinations.

When the driving command of the three-phase motor 30 is generated (S30), it may be determined whether the single-phase motor 40 is driven (S31).

In addition, the alignment method of the three-phase motor 30 differs depending on whether the single-phase motor 40 is driven.

First, the case where the single-phase motor 40 is stopped will be described.

As shown in FIGS. 13 and 14, the combination having the largest output voltage has the conditions (Sa, Sb)=(1, 0) and (Sa, Sb)=(0, 1). In other words, the largest voltage vector is generated under two conditions or a combination.

Therefore, the three-phase motor 30 may be aligned by generating the largest voltage vector (S32), and then the three-phase motor 30 is aligned by using the two voltage vectors. Thereafter, the three-phase motor 30 can be controlled to be started and operated normally.

That is, the motor may be aligned under any one of two conditions for the motor alignment. Obviously, it is also possible to set only one of the two conditions as the default.

Specifically, when the single-phase motor 40 is stopped, the three-phase motor 30 is aligned by using a section in which both the upper DC link voltage V1 and the lower DC link voltage V2 are applied to the four-phase motor through the two pairs among the three pairs.

That is, the two pairs among the three pairs are controlled to artificially apply both the upper DC link voltage and the lower DC link voltage so that the three-phase motor 30 is aligned.

At this time, the on/off state of the two pairs among the three pairs or the signal combination of the two pairs among the three pairs is clearly illustrated in FIGS. 13 and 14.

Next, the alignment of the three-phase motor 30 during the operation of the single-phase motor 40 is explained.

The upper DC link voltage V1 is used at a time of a sequence of turning on the upper switch Sc among the other pair among the three pairs Sc, Sc_bar, i.e. at a time when Sc=1.

Therefore, in this section, it may be preferable that the three-phase motor 30 is aligned by using a sequence which uses only a lower DC link voltage corresponding to a voltage of the lower DC-link capacitor in the two pairs among the three pairs Sa, Sa_bar, Sb, and Sb_bar, i.e. by using (Sa, Sb)=(0, 0). This eliminates voltage unbalance.

On the other hand, the lower DC link voltage V2 is used at a time of a sequence of turning on the lower switch Sc_bar among the other pair among the three pairs Sc, Sc_bar, i.e. at a time when Sc=0.

Therefore, in this section, the three-phase motor 30 is aligned by using a sequence which uses only an upper DC link voltage corresponding to a voltage of the upper DC-link capacitor, i.e. by using (Sa, Sb)=(1, 1) switching combination condition.

That is, when the single-phase motor 40 is driven, unlike the case where the single-phase motor 40 is stopped, it may be preferable to minimize the voltage unbalance in consideration of unbalance.

Therefore, in this case, in order to minimize voltage unbalance, the alignment of the three-phase motor 30 can be performed by controlling the two pairs among the three pairs such that the lower DC link voltage is used in the three-phase motor 30 in a section where the upper DC link voltage is used in the single-phase motor 40 (S36).

In addition, the alignment of the three-phase motor 30 can be performed by controlling the two pairs among the three pairs such that the upper DC link voltage is used in the three-phase motor 30 in a section where the lower DC link voltage is used in the single-phase motor 40 (S36).

Therefore, when the three-phase motor 30 is aligned, the driving combination of the two pairs among the three pairs differs depending on whether the single-phase motor 40 is driven.

That is, in some cases, the alignment is performed using a large force, and in other cases, the alignment is performed by minimizing voltage unbalance. In the former case, since voltage unbalance does not occur, it is possible to perform the alignment using a large force. In the latter case, the eliminating of the voltage unbalance is more effective for the alignment method than the use of a large force.

In some exemplary embodiments, when the single-phase motor 40 is driven, as described above, the three-phase motor 30 can also be aligned through other combination of switching unit. In this case, the condition of the speed or load equal to or lower than the threshold can be set.

That is, even if the single-phase motor 40 is in operation, the three-phase motor 30 can be aligned under the conditions (Sa, Sb)=(1, 0) and (Sa, Sb)=(0, 1).

In this case, a voltage sensor capable of measuring the voltages V1 and V2 of both sides of the upper and lower DC may be provided, or a voltage estimation algorithm or a low single-phase motor 40 driving current condition may be applied. That is, it can be limitedly applied under the condition of the speed or load equal to or lower than the threshold.

However, in this case, the threshold point setting is not easy, and the control algorithm of the motor is complicated. Obviously, for precise control and immediate driving of a three-phase motor 30, it may be possible to set a threshold and control by differently setting a condition equal to or lower than the threshold and a threshold exceeding condition, or a condition below the threshold and a condition equal to or higher than the threshold.

Hereinafter, a driving method when both the three-phase motor 30 and the single-phase motor 40 are stopped will be described.

First, when a simultaneous driving command is generated for two motors, one of the two motors may be controlled to drive first. When such a driving command is reached, the motor driver may sequentially perform the driving command.

Obviously, it is possible to sequentially transmit the driving command from the processor of the home appliance that transmits the driving command to the motor driver.

Specifically, the motor driver may control any one motor to be driven, and then control the other motor to be driven after a given time.

When the driving command of the single-phase motor 40 and the driving command of the three-phase motor 30 arrive at the motor driver simultaneously, the motor driver drives first one of the single-phase motor 40 and the three-phase motor 30, and then the other one can be controlled to drive. Thus, a complex control algorithm can be avoided and expected voltage unbalance can be prevented or minimized.

In order to eliminate voltage unbalance, in the state where three-phase motor 30 is all started and driven, it may be preferable to control the parallel operation of the single-phase motor 40 and the three-phase motor 30 in the case where the speeds of the single-phase motor 40 and the three-phase motor 30 are the same to be different from the case where the speeds of the single-phase motor 40 and the three-phase motor 30 are different.

That is, in the simultaneous driving condition (S40) of the single-phase motor 40 and the three-phase motor 30 (S40), it is determined whether the speeds of both are the same (S41), and the control method may be changed according to the result.

When both single-phase motor 40 and three-phase motor 30 are driven, if the output voltage unbalance is not controlled early, current ripple occurs, and not only the lifespan of the upper and lower DC link capacitors Ca and Cb decreases, but in severe cases, the motor may be stopped due to the step-out phenomenon.

Therefore, when both the single-phase motor 40 and the three-phase motor 30 are driven, it is more preferable to eliminate the output voltage unbalance early.

First, when both motors are accelerated at the same speed or driven at the same speed, voltage vector misalignment may be performed (S43). When both motors are driven at a different speed, single-phase motor 40 buffering may be performed (S42).

The voltage vector misalignment is described in detail.

When the electrical angle of the three-phase motor 30 is 90 degrees, the electrical angle of the single-phase motor 40 becomes 180 so that they are different from each other.

Therefore, it is not easy to eliminate the voltage unbalance due to such a difference in angle. In the present embodiment, in order to solve this problem, a method of eliminating the voltage unbalance in different ways under different conditions is proposed.

Figure 15:
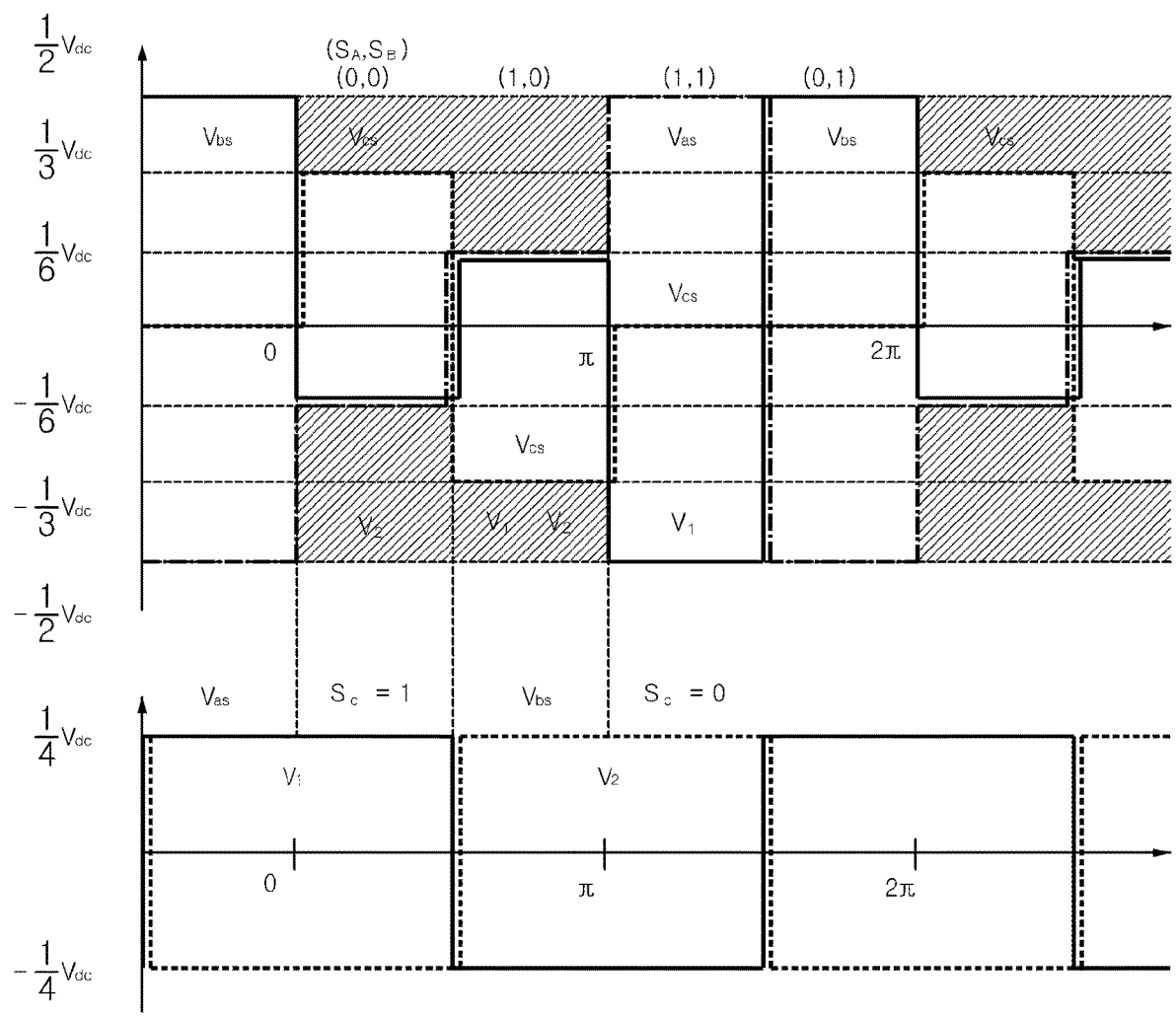
FIG. 15 is a sequential operation of a three-phase switching unit and a single-phase switching unit for canceling an output voltage unbalance in an embodiment of the present disclosure.

FIG. 15 shows a switching flowchart in the simultaneous driving of the single-phase motor 40 and the three-phase motor 30.

The voltage (upper diagram) of each phase applied to the three-phase motor 30 according to the switching of respective switching units and the voltage (lower diagram) applied to the single-phase motor 40 are shown.

Under the condition of simultaneous acceleration (same acceleration slope) or the same drive speed, the voltage vector of the single-phase motor 40 is output at a specific electrical angle position in synchronization with the position information and the rotational speed of the three-phase motor 30. The used voltages of the DC link capacitor are different according to the switching conditions of the single-phase and three-phase motor 30s.

Therefore, when the maximum voltage output position of each motor is the same, voltage unbalance can be maximized. Therefore, in the present embodiment, the voltage unbalance can be minimized by allowing the maximum voltage output positions of the respective motors to cross or deviate.

Through this, it is also possible to improve the response to the load torque.

When the DC voltage is referred to as Vdc, the voltage of a-phase is Vas, the voltage of b-phase is Vbs, and the voltage of c-phase is Vcs. Changes in a-phase voltage, b-phase voltage and c-phase voltage are indicated as green, red and blue lines, respectively.

As the switching condition Sa and Sb change to (0, 0), (1, 1), (1, 0) and (0, 1), respectively, the voltage of each phase is varied.

As shown, it can be seen that under (0, 0) condition, Vas=Vbs=−Vdc/6, and Vcs=Vdc/3. It can be seen that under (1, 1), Vas=Vbs=Vdc/6 and Vcs=−Vdc/3. It can be seen that under (1, 0), Vas=½Vdc, Vbs=−½Vdc, and Vcs=0. It can be seen that under (0, 1), Vas=−½Vdc, Vbs=½Vdc and Vcs=0.

As shown, in the (1, 0) and (0, 1) conditions in which the voltage of the a-phase and the voltage of the b-phase is maximized, that is, in the switching section, it can be seen that the voltage of c-phase (the voltage which is also applied to the single-phase motor 40 and shared by the single-phase motor 40 and the three-phase motor 30) becomes zero. On the other hand, in the conditions (0, 0) and (1, 1) where the voltage of c-phase becomes maximum, that is, in the switching section, it can be seen that the voltages of a-phase and b-phase are lower than the maximum.

Thus, by varying the maximum voltage output position (i.e. time point) of each motor, it is possible to reduce the voltage unbalance.

As shown in FIG. 15, when the characteristic values (parameters) of the single-phase motor 40 and the three-phase motor 30 are different from each other, there may be a phase change of the voltage vector output position.

However, it can be seen that each phase difference is uniform and fixed. Thus, by applying the present embodiment, the electrical frequencies of the two motors coincide.

Next, a single-phase motor 40 buffering method that can be used when the driving conditions of two motors are different from each other will be described.

Figure 16:
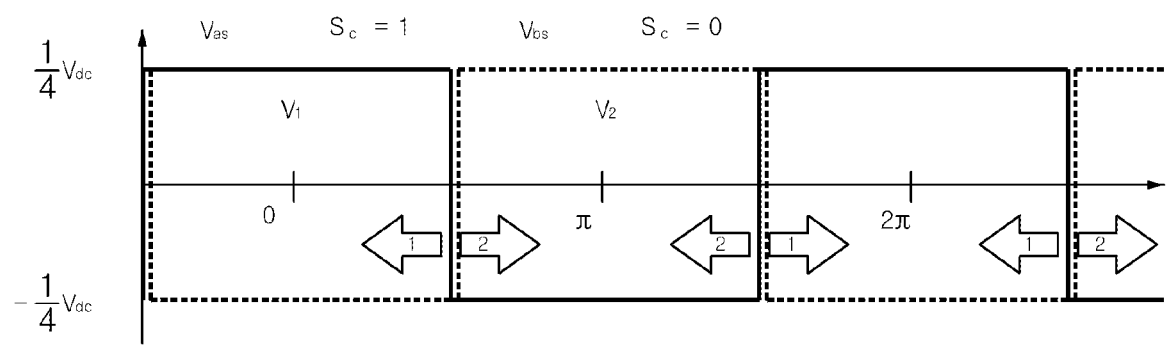
FIG. 16 shows a sequential operation of a single-phase switching unit for canceling an output voltage unbalance in another embodiment of the present disclosure.

As shown in FIG. 16, when the driving conditions of two motors are different from each other, the control of the three-phase motor 30 can be maintained and the control method of the single-phase motor 40 can be changed.

That is, the control of the two pairs among the three pairs can be maintained and the control of the other pair among the three pairs can be changed.

That is, the control for eliminating the voltage unbalance of upper and lower DC-link capacitors can be all performed through the control of the single-phase motor 40. This may mean to allocate all the additional torque ripple that can be generated by the output voltage unbalance to the single-phase motor 40 not to the three-phase motor 30.

This is because it is more effective in a device control that the inevitably generated torque ripple is buffered in the single-phase motor 40 rather than in the three-phase motor 30.

That is, the torque ripple reduction in the apparatus in which the three-phase motor 30 is used is more effective than in the apparatus in which the single-phase motor 40 is used.

For example, when the drum drive motor and the drain pump motor of the washing machine are controlled in parallel, a three-phase motor 30 may be used for the drum drive motor and a single-phase motor 40 may be used for the drain pump motor for more precise control.

Therefore, it is preferable that the torque ripple reduction in the drum drive motor takes precedence over the torque ripple reduction in the drain pump motor. For the same reason, when the driving speeds of the two motors are different from each other, for the voltage unbalance problem, it may be preferable to all buffer in the single-phase motor 40.

For this buffering, as shown in FIG. 16, the cycle of the other pair among the three pairs may be changed.

When the lower DC-Link voltage V2 is larger than the upper DC-Link voltage V1, a first section may be decreased and a second section may be increased within one cycle.

When the upper DC-Link voltage V1 is larger than the lower DC-Link voltage V2, the first section may be increased and the second section may be decreased within one cycle.

That is, when the voltage unbalance occurs between the upper DC-Link voltage V1 and the lower DC-Link voltage V2, the voltage unbalance can be solved by changing an output time of the lower DC-Link voltage V2 and an output time of the upper DC-Link voltage V1.

Specifically, when the lower DC-Link voltage V2 is larger than the upper DC-Link voltage V1, the upper DC-Link voltage V1 and the lower DC-Link voltage V2 can be controlled to be the same by increasing the output time of the lower DC-Link voltage (which means a decrease in the output time of the upper DC-Link voltage V1).

On the other hand, when the upper DC-Link voltage V1 is larger than the lower DC-Link voltage V2, the upper DC-Link voltage V1 and the lower DC-Link voltage V2 can be controlled to be the same by increasing the output time of the upper DC-Link voltage V1.

Such an increase and decrease of the first and second sections may be performed in proportion. That is, the increase and decrease is performed at the same ratio within one cycle, and this ratio can be uniformly maintained as the cycle progresses.

That is, if the first section increases by 10% within one cycle, the second section decreases by 10%. This pattern can be maintained even when the next cycle is performed.

That is, it can be maintained until the unbalance of the upper DC-Link voltage V1 and the lower DC-Link voltage V2 is resolved. Then, when the unbalance of the upper DC-Link voltage V1 and the lower DC-Link voltage V2 is solved, it can be controlled so that the first section and the second section have the same interval.

Through this single-phase motor buffering method, torque ripple in the single-phase motor is inevitably increased, but the increase in unbalance can be minimized and the torque ripple can be controlled with an acceptable level.

Therefore, even when the voltages of V1 and V2 are different from each other, as an example of the control pattern of the three-phase motor, the duty ratio can be uniformly maintained and controlled. Therefore, the control pattern of the three-phase motor that requires more precise control is maintained without changing. On the contrary, if necessary, the control pattern of the single-phase motor is changed to minimize the voltage unbalance.

Meanwhile, in the above-described embodiments, the control method in each case when the single-phase motor and the three-phase motor are operated in parallel is described.

However, due to the characteristics of a home appliance to which a three-phase motor and a single-phase motor are applied, and which is equipped with a motor driving device for driving control through a single inverter, all of the above-described cases may not occur.

For example, it may be a home appliance having the three-phase motor and the single-phase motor which are not driven at the same time. In particular, both may be driven during normal operation, but driving time may be sequentially progressed. In addition, it may be a home appliance in which both the three-phase motor and the single-phase motor are driven at the same speed when both are driven.

Therefore, even if the motor driver according to the present embodiment described above is applied to a specific home appliance, the control method in all cases may not be necessary.

According to an embodiment of the present disclosure, it is possible to provide a motor driver that can effectively perform a parallel operation of a single-phase motor and a three-phase motor through a single inverter, and a control method thereof.

According to an embodiment of the present disclosure, it is possible to provide a motor alignment method that can eliminate the non-available starting of a single-phase motor and maximize the starting torque.

According to an embodiment of the present disclosure, it is possible to provide a motor alignment method that can maximize the starting torque in a three-phase motor.

According to an embodiment of the present disclosure, it is possible to provide a motor driver that can stably drive a single-phase motor and a three-phase motor by solving the voltage unbalance, and a control method thereof.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving device configured to control a three-phase motor and a single-phase motor to operate in parallel, the motor driving device comprising:

a dc terminal in which an upper and a lower DC-link capacitor are located;
a neutral terminal disposed between the upper and lower DC-link capacitors; and
an inverter, including three pairs of upper and lower switching elements and being connected to the dc terminal, wherein
 a first pair and a second pair of the three pairs of upper and lower switching elements are connected to an a-phase terminal and a b-phase terminal of the three-phase motor, respectively;
 a third pair of the three pairs of upper and lower switching elements is connected to a first terminal of the single-phase motor; and
 the neutral terminal is connected to a c-phase terminal of the three-phase motor and a second terminal of the single-phase motor.

2. The motor driving device of claim 1, wherein a maximum time period for which a first upper switching element and a first lower switching element are turned on or off is set to be smaller than a sum of a dead time and an idle time of the first upper switching element and the first lower switching element.

3. The motor driving device of claim 1, wherein, when a driving command of the single-phase motor is received by the motor driving device, the motor driving device is configured to:
align a rotor of the single-phase motor to a position at which a starting torque is greater than zero.

4. The motor driving device of claim 3, wherein the motor driving device is configured to align the rotor by applying a pulsating current to the single-phase motor during operation of the first upper switching element and the first lower switching element.

5. The motor driving device of claim 3, further configured to align the rotor to differentiate a first value of current and a first torque applied to the single-phase motor from a second value of current and a second torque applied to the single-phase motor.

6. The motor driving device of claim 3, wherein the motor driving device is configured to change a driving method of the single-phase motor based on whether the three-phase motor is currently being driven, when the driving command of the single-phase motor is received at the motor driving device.

7. The motor driving device of claim 6, wherein when the three-phase motor is being driven, the motor driving device is configured to apply a pulsating current to generate a forward or reverse rotational torque on the single-phase motor during the operation of the first upper switching element and the first lower switching element.

8. The motor driving device of claim 7, wherein the motor driving device is configured to apply a pulsating current to the single-phase motor
in a section in which only an upper DC link voltage associated with the upper DC-link capacitor is applied to the three-phase motor through the first and second pairs, and
in a section where only a lower DC link voltage corresponding to a voltage of the lower DC-link capacitor is applied, and
wherein the motor driving device is configured to:
turn on a first upper switching element to output a positive current in a section where only the lower DC link voltage is applied to the three-phase motor; and
turn on a first lower switching element to output a negative current in a section where only the upper DC link voltage is applied to the three-phase motor, such that a voltage unbalance applied to the three-phase motor is reduced.

9. The motor driving device of claim 3, wherein when the driving command of the three-phase motor is received by the motor driving device the motor driving device is configured to change a driving method of the three-phase motor based on whether the single-phase motor is currently being driven.

10. The motor driving device of claim 9, wherein, when the single-phase motor is stopped, the motor driving device is configured to align the three-phase motor in a section in which both an upper DC link voltage and a lower DC link voltage are applied to the three-phase motor using the first and second pairs; and
when the single-phase motor is being driven, the motor driving device is configured to:
align the three-phase motor by applying only the lower DC link voltage to the three-phase motor in a section where only the upper DC link voltage is applied to the single-phase motor; and
align the three-phase motor by applying only the upper DC link voltage to the three-phase motor in a section where only the lower DC link voltage is applied to the single-phase motor.

11. The motor driving device of claim 3, wherein when the driving command of the single-phase motor and the driving command of the three-phase motor are received by the motor driving device, the motor driving device is configured to sequentially drive one of the single-phase motor or the three-phase motor followed by the other of the single-phase motor or the three-phase motor.

12. The motor driving device of claim 3, wherein the motor driving device is configured to differentiate a maximum voltage output position of the single-phase motor from a maximum voltage output position of the three-phase motor, when both the single-phase motor and the three-phase motor are being driven and speeds of the single-phase motor and the three-phase motor are the same.

13. The motor driving device of claim 3, wherein the motor driving device is configured to differentiate a ratio of a section in which only a upper DC link voltage corresponding to a voltage of the upper DC-link capacitor is applied to the single-phase motor, from a ratio of a section in which only a lower DC link voltage corresponding to a voltage of the lower DC-link capacitor is applied to the single-phase, when both the single-phase motor and the three-phase motor are driven and speeds of the single-phase motor and the three-phase motor are different.

14. The motor driving device of claim 13, wherein, when the lower DC link voltage is larger than the upper DC link voltage, the motor driving device is configured to control driving of the third pair such that the section in which only the upper DC link voltage is applied decreases and the section in which only the lower DC link voltage is applied increases within one cycle, and
when the lower DC link voltage is smaller than the upper DC link voltage, the motor driving device is configured to control the driving of the third pair such that the section in which only the upper DC link voltage is applied increases and the section in which only the lower DC link voltage is applied decreases within one cycle.

15. The motor driving device of claim 1, wherein the motor driving device is configured to control the single-phase motor and the three-phase motor to be interlocked and operate in parallel through the third pair and the first and second pairs, when the single-phase motor and the three-phase motor are simultaneously driven.

16. The motor driving device of claim 15, wherein when both the single-phase motor and the three-phase motor are being driven, the motor driving device is configured to control a parallel operation of the single-phase motor and the three-phase motor such that the parallel operation when speeds of the single-phase motor and the three-phase motor are the same is different from when speeds of the single-phase motor and the three-phase motor are different.

17. The motor driving device of claim 16, wherein the motor driving device is configured to output a voltage of the single-phase motor in association with or synchronized with an electrical angle reference position information of the three-phase motor.

18. The motor driving device of claim 16, wherein the motor driving device is configured to maintain a driving condition of the first pair and the second pair and vary a driving condition of the third pair.

* * * * *